US012649515B2

(12) United States Patent
Kim et al.

(10) Patent No.: US 12,649,515 B2
(45) Date of Patent: Jun. 9, 2026

(54) DEVICE AND METHOD FOR DETECTING ABNORMALITY OF WHEEL ACTUATING MOTOR, AND COMPUTER-READABLE STORAGE MEDIUM STORING PROGRAM FOR PERFORMING THE METHOD

(71) Applicant: HL MANDO CORPORATION, Gyeonggi-do (KR)

(72) Inventors: Gyuwon Kim, Gyeonggi-do (KR); Jongick Won, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/893,782

(22) Filed: Sep. 23, 2024

(65) Prior Publication Data

US 2025/0100614 A1      Mar. 27, 2025

(30) Foreign Application Priority Data

Sep. 22, 2023   (KR) ........................ 10-2023-0127146
May 8, 2024   (KR) ........................ 10-2024-0060708

(51) Int. Cl.
B62D 5/04         (2006.01)

(52) U.S. Cl.
CPC ......... B62D 5/0493 (2013.01); B62D 5/0487 (2013.01)

(58) Field of Classification Search
CPC ...... B62D 5/0493; B62D 5/0487; B62D 6/00; G06N 3/045; G06N 3/047; G06N 3/084; G06N 3/088; G06N 20/10; G06N 3/08
See application file for complete search history.

(56) References Cited

U.S. PATENT DOCUMENTS

2024/0185075 A1 *   6/2024   Du ........................ H04N 19/521

FOREIGN PATENT DOCUMENTS

KR         10-1962647         7/2019

OTHER PUBLICATIONS

Fu et al., Application of Neural Network Trained by Adaptive Particle Swarm Optimization to Fault Diagnosis for Steer-by-Wire System, 2010, International Conference on Measuring Technology and Mechatronics Automation, pp. 652-655 https:// ieeexplore.ieee. org/stamp/stamp.jsp?tp=&arnumber=5458997 (Year: 2010).*

(Continued)

*Primary Examiner* — Long T Tran
*Assistant Examiner* — Charles J Brauch
(74) *Attorney, Agent, or Firm* — WOMBLE BOND DICKINSON (US) LLP

(57) ABSTRACT

Disclosed are a wheel actuating motor abnormality detection device and method and a non-transitory computer-readable storage medium in which a program for performing the method is stored. The wheel actuating motor abnormality detection device detects abnormality of a steering motor disposed in a steer-by-wire system of a vehicle and configured to provide a reaction force against manipulation of a steering wheel, and includes a memory in which one or more instructions are stored and a processor configured to execute the one or more instructions, wherein the processor executes the one or more instructions to input input value related to driving of a rack, obtain one or more estimation values related to steering output by the artificial neural network model, and compare the one or more estimation values with one or more actual measurement values related to steering to detect whether the steering motor is abnormal, wherein the rack receives a driving force from a wheel actuator driven to correspond to the manipulation of the steering wheel and moves a wheel of the vehicle.

16 Claims, 5 Drawing Sheets

(56)           References Cited

OTHER PUBLICATIONS

Madane et al., Transformer-based conditional generative adversarial network for multivariate time series generation, Oct. 5, 2022, Cornell University, arXiv:2210.02089, pp. 1-11. https://arxiv.org/abs/2210.02089 (Year: 2022).*

* cited by examiner

270 : 271, 272, 273, 274

100 : 110, 120

21

$$D_{Error} = [ \; \mu_{E(R1)}, \; \delta_{E(R1)}, \; Max_{E(R1)}, \; DS_{R1},$$
$$\mu_{E(R2)}, \; \delta_{E(R2)}, \; Max_{E(R2)}, \; DS_{R2} \; ]$$

Figures 8, 9:
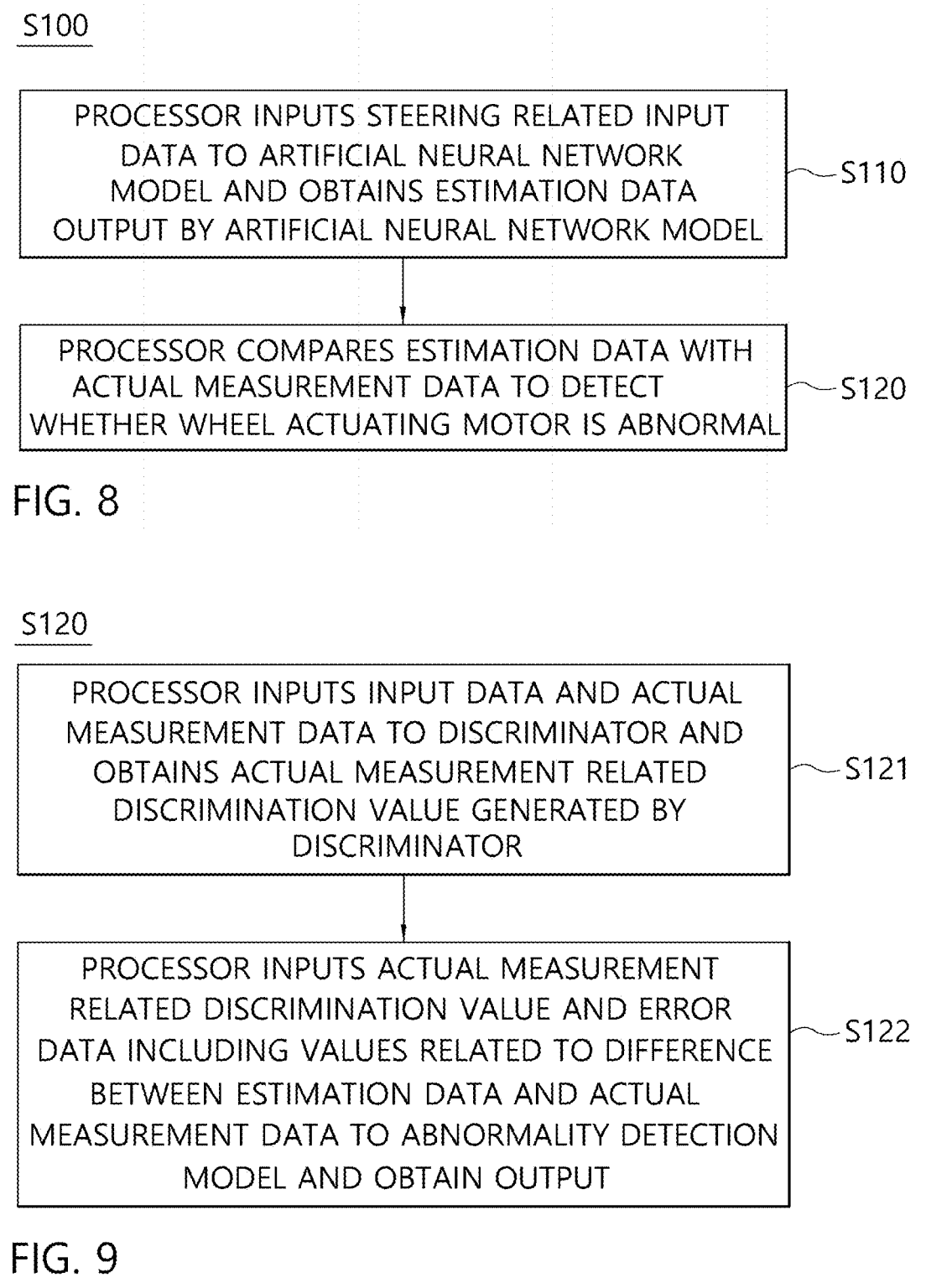

S100

PROCESSOR INPUTS STEERING RELATED INPUT DATA TO ARTIFICIAL NEURAL NETWORK MODEL AND OBTAINS ESTIMATION DATA OUTPUT BY ARTIFICIAL NEURAL NETWORK MODEL —S110

PROCESSOR COMPARES ESTIMATION DATA WITH ACTUAL MEASUREMENT DATA TO DETECT WHETHER WHEEL ACTUATING MOTOR IS ABNORMAL —S120

PROCESSOR INPUTS INPUT DATA AND ACTUAL MEASUREMENT DATA TO DISCRIMINATOR AND OBTAINS ACTUAL MEASUREMENT RELATED DISCRIMINATION VALUE GENERATED BY DISCRIMINATOR —S121

PROCESSOR INPUTS ACTUAL MEASUREMENT RELATED DISCRIMINATION VALUE AND ERROR DATA INCLUDING VALUES RELATED TO DIFFERENCE BETWEEN ESTIMATION DATA AND ACTUAL MEASUREMENT DATA TO ABNORMALITY DETECTION MODEL AND OBTAIN OUTPUT —S122

DEVICE AND METHOD FOR DETECTING ABNORMALITY OF WHEEL ACTUATING MOTOR, AND COMPUTER-READABLE STORAGE MEDIUM STORING PROGRAM FOR PERFORMING THE METHOD

CROSS-REFERENCE TO RELATED APPLICATIONS

This application claims priority to and the benefit of Korean Patent Application No. 10-2023-0127146, filed on Sep. 22, 2023, and Korean Patent Application No. 10-2024-0060708, filed on May 8, 2024, the disclosures of which are incorporated herein by reference in their entireties.

TECHNICAL FIELD

The present disclosure relates to a wheel actuating motor abnormality detection device and method and a non-transitory computer-readable storage medium in which a program for performing the method is stored, and more specifically, to a wheel actuating motor abnormality detection device and method for detecting abnormality of a wheel actuating motor, which is disposed in a steer-by-wire system of a vehicle and provides a driving force for steering a wheel of the vehicle, and a non-transitory computer-readable storage medium in which a program for performing the method is stored.

RELATED ART

A steer-by-wire system is a steering system which transmits a steering intention of a driver to a wheel of a vehicle through an electric signal without a mechanical connection between a steering wheel of the vehicle and the wheel of the vehicle. The steer-by-wire system prevents generation of unnecessary vibrations and the like and improves accuracy and responsiveness of steering by minimizing the mechanical connection. In addition, the steer-by-wire system provides a high degree of freedom in a viewpoint of layout and facilitates common use of parts and the like.

A steer-by-wire system includes a steering feeling actuator (SFA) for providing a reaction force of a steering wheel to a driver of a vehicle and a road wheel actuator (RWA) for transmitting a steering intention of the driver to a wheel of the vehicle to move the wheel. Generally, the SFA and the RWA are provided as motors.

The motor constituting the RWA may be provided as a permanent magnet synchronous motor (PMSM). An output torque of the PMSM is gradually reduced due to demagnetization or the like caused by degradation.

When the output torque of the RWA is reduced, the driver should have a feedback of different ride comfort from the steering intention of the driver. Such different feedback causes an accident due to a steering error. Accordingly, the development of a technology allowing abnormality of a motor to be prognosed instead of post-diagnosing of a failure is required to improve the stability of the steer-by-wire system.

SUMMARY

The present disclosure is directed to solving the above-described problems and providing a wheel actuator motor abnormality detection device and method for detecting performance degradation of a wheel actuator disposed in a steer-by-wire system of a vehicle and configured to provide a driving force for steering a wheel of a vehicle, and a non-transitory computer-readable storage medium in which a program for performing the method is stored.

The present disclosure is also directed to providing a wheel actuator motor abnormality detection device and method for effectively detecting output torque reduction of a wheel actuating motor in advance without using an additional sensor in addition to a sensor, which is disposed in the conventional vehicle, in a vehicle, and a non-transitory computer-readable storage medium in which a program for performing the method is stored.

The objects of the present disclosure are not limited to the above-described objects, and other objects that are not mentioned will be able to be clearly understood by those skilled in the art to which the present disclosure pertains from the following description.

In accordance with one aspect of the present disclosure, there is provided a wheel actuating motor abnormality detection device for detecting abnormality of a wheel actuating motor disposed in a steer-by-wire system of a vehicle and configured to provide a driving force for steering a wheel of the vehicle, the wheel actuating motor abnormality detection device including a memory in which one or more instructions are stored and a processor configured to execute the one or more instructions, wherein the processor executes the one or more instructions to input input data related to steering of the vehicle to an artificial neural network model, obtain steering related estimation data output by the artificial neural network model, and compare the estimation data with actual measurement data to detect whether the wheel actuating motor is abnormal.

In the wheel actuating motor abnormality detection device according to one aspect of the present disclosure, the input data may include one or more among a speed of the vehicle, a steering angle of a steering wheel of the vehicle, and a propulsive force of a rack configured to receive the driving force from the wheel actuating motor and move the wheel of the vehicle.

In the wheel actuating motor abnormality detection device according to one aspect of the present disclosure, the estimation data may include a first estimation value for a first residual which is a difference between a command value for a rack position determined to correspond to the input data and a measurement value for the rack position, and the actual measurement data may include a first actual measurement value which is an actual measurement value for the first residual.

In the wheel actuating motor abnormality detection device according to one aspect of the present disclosure, the estimation data may further include a second estimation value for a second residual which is a difference between a command value of a motor torque determined to correspond to the input data and generated by the wheel actuating motor and a measurement value of the motor torque, and the actual measurement data may further include a second actual measurement value which is an actual measurement value for the second residual.

In the wheel actuating motor abnormality detection device according to one aspect of the present disclosure, the input data may be obtained through a controller area network (CAN) of the vehicle.

In the wheel actuating motor abnormality detection device according to one aspect of the present disclosure, the artificial neural network model may be formed in a generative adversarial network (GAN) including a generator configured to receive the input data and generate the estimation data, and a discriminator configured to receive the input data and the actual measurement data and output an actual measurement related discrimination value.

In the wheel actuating motor abnormality detection device according to one aspect of the present disclosure, the generator may be provided as a multivariate transformer.

In the wheel actuating motor abnormality detection device according to one aspect of the present disclosure, the processor may execute the one or more instructions to input error data related to a difference between the estimation data and the actual measurement data to an abnormality detection model to determine whether the wheel actuating motor is abnormal.

In the wheel actuating motor abnormality detection device according to one aspect of the present disclosure, the abnormality detection model may use a one-class support vector machine (OCSVM) algorithm.

In the wheel actuating motor abnormality detection device according to one aspect of the present disclosure, there may be a plurality of data sets each including the input data, the estimation data, and the actual measurement data, and the error data may include an average and a standard error of errors between the actual measurement data and the estimation data of the plurality of data sets, a maximum absolute error between the actual measurement data and the estimation data of the plurality of data sets, and an actual measurement related discrimination value of the discriminator for the input data and the actual measurement data included in the plurality of data sets.

In the wheel actuating motor abnormality detection device according to one aspect of the present disclosure, the discriminator may further receive the input data and the estimation data and further output an estimation related discrimination value.

In the wheel actuating motor abnormality detection device according to one aspect of the present disclosure, the artificial neural network model may be built by alternately performing learning of the generator and the discriminator, and the input data and the actual measurement data used for the learning may be obtained in a normal state of each of the vehicle and the wheel actuating motor.

In accordance with another aspect of the present disclosure, there is provided a wheel actuating motor abnormality detection method for detecting abnormality of a wheel actuating motor disposed in a steer-by-wire system of a vehicle and configured to provide a driving force for steering a wheel of the vehicle, the wheel actuating motor abnormality detection method including inputting, by a processor, input data related to steering of the vehicle to an artificial neural network model and obtaining steering related estimation data output by the artificial neural network model and comparing, by the processor, the estimation data with actual measurement data and detecting whether the wheel actuating motor is abnormal.

In the wheel actuating motor abnormality detection method according to one aspect of the present disclosure, the input data may include one or more among a speed of the vehicle, a steering angle of a steering wheel of the vehicle, and a propulsive force of a rack configured to receive the driving force from the wheel actuating motor and move the wheel of the vehicle.

In the wheel actuating motor abnormality detection method according to one aspect of the present disclosure, the estimation data may include a first estimation value for a first residual which is a difference between a command value for a rack position determined to correspond to the input data and a measurement value for the rack position, and the actual measurement data may include a first actual measurement value which is an actual measurement value for the first residual.

In the wheel actuating motor abnormality detection method according to one aspect of the present disclosure, the estimation data may further include a second estimation value for a second residual which is a difference between a command value of a motor torque determined to correspond to the input data and generated by the wheel actuating motor and a measurement value of the motor torque, and the actual measurement data may further include a second actual measurement value which is an actual measurement value for the second residual.

In the wheel actuating motor abnormality detection method according to one aspect of the present disclosure, the artificial neural network model may be formed in a GAN including a generator configured to receive the input data and generate the estimation data and a discriminator configured to receive the input data and the actual measurement data and output an actual measurement related discrimination value.

In the wheel actuating motor abnormality detection method according to one aspect of the present disclosure, the detecting of whether the wheel actuating motor is abnormal may include inputting, by the processor, the input data and the actual measurement data to the discriminator and obtaining the actual measurement related discrimination value generated by the discriminator, and inputting, by the processor, the actual measurement related discrimination value and error data including values related to a difference between the estimation data and the actual measurement data to an abnormality detection model and obtaining an output of the abnormality detection model.

In the wheel actuating motor abnormality detection method according to one aspect of the present disclosure, there may be a plurality of data sets each including the input data, the estimation data, and the actual measurement data, and the error data may include an average and a standard error of errors between the actual measurement data and the estimation data of the plurality of data sets, a maximum absolute error between the actual measurement data and the estimation data of the plurality of data sets, and an actual measurement related discrimination value of the discriminator for the input data and the actual measurement data included in the plurality of data sets.

In accordance with still another aspect of the present disclosure, there is provided a non-transitory computer-readable storage medium in which a program including an instruction for performing the wheel actuating motor abnormality detection method is stored.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 8 is a flowchart illustrating a wheel actuating motor abnormality detection method according to one embodiment of the present disclosure; and FIG. 9 is a detailed flowchart illustrating detecting whether a wheel actuating motor is abnormal in the wheel actuating motor abnormality detection method according to one embodiment of the present disclosure.

DETAILED DESCRIPTION OF EMBODIMENTS

Figure 1:
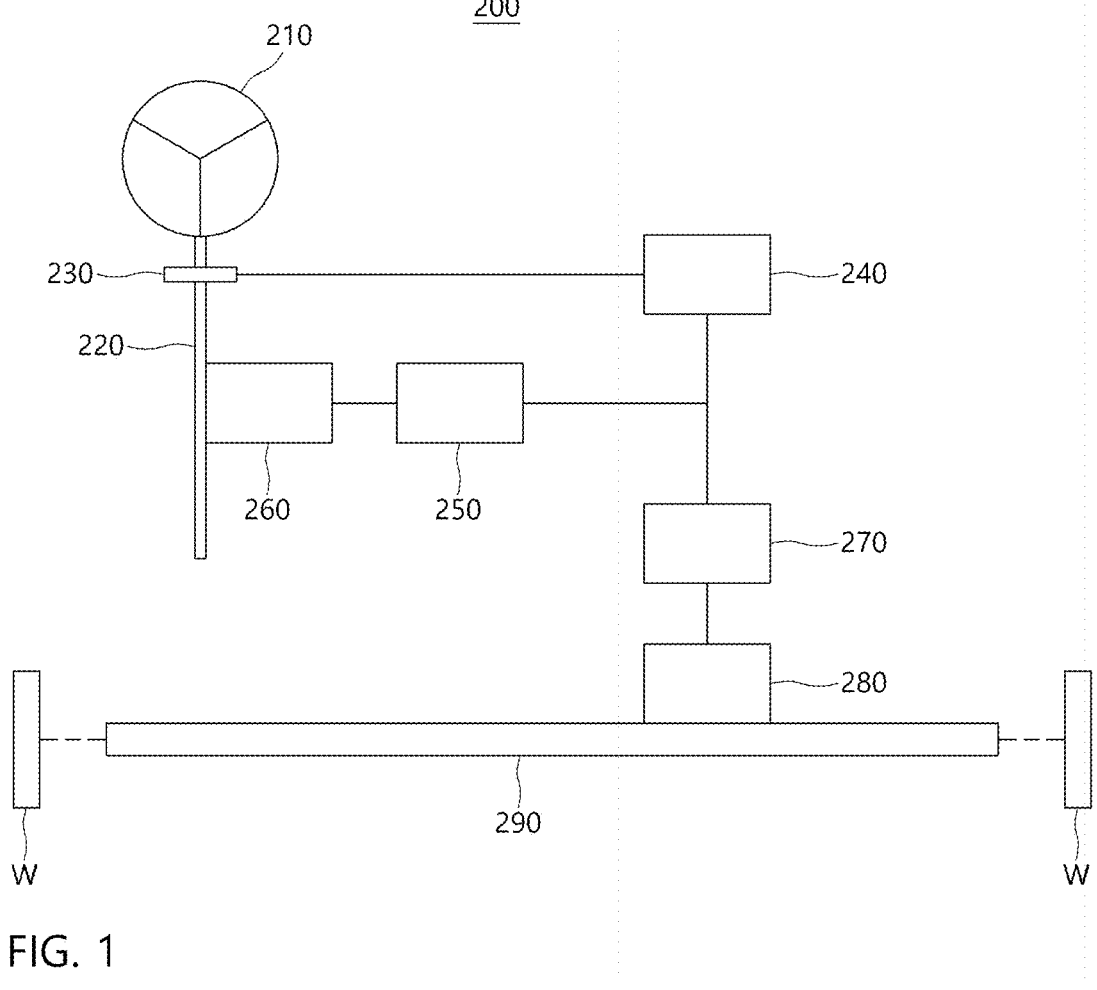
FIG. 1 is a schematic view illustrating a configuration of a steer-by-wire system of a vehicle.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their invention.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

FIG. 1 is a schematic view illustrating a configuration of a steer-by-wire system of a vehicle.

A steer-by-wire system 200 is a steering system for transmitting a steering intention of a driver to a wheel W of the vehicle through an electric signal without mechanical connection between a steering wheel 210 of the vehicle and the wheel W of the vehicle. In the steer-by-wire system, a steering column 220 coupled to the steering wheel 210 does not have any mechanical connection structure with the wheel W of the vehicle.

When the driver of the vehicle manipulates the steering wheel 210, a steering sensor 230 detects one or more of a steering torque and a steering angular speed. In other words, the steering sensor 230 may include one or more of a torque sensor and a steering angle sensor.

In addition, the steer-by-wire system 200 includes a steering motor 260 for providing a reaction force corresponding to manipulation of the steering wheel 210 to the driver and a wheel actuating motor 280 for moving the wheel W. The steering motor 260 provides a steering feeling to the driver. In addition, the wheel actuating motor 280 moves a rack 290 connected to the wheel W. As the rack 290 is moved according to driving of the wheel actuating motor 280, the vehicle may be steered.

Meanwhile, sensing information of the steering sensor 230 is transmitted to an electronic control unit 240. The electronic control unit 240 may transmit a control signal to a steering motor controller 250 for controlling the steering motor 260 and a wheel actuating motor controller 270 for controlling the wheel actuating motor 280 on the basis of the sensing information of the steering sensor 230.

Figure 2:
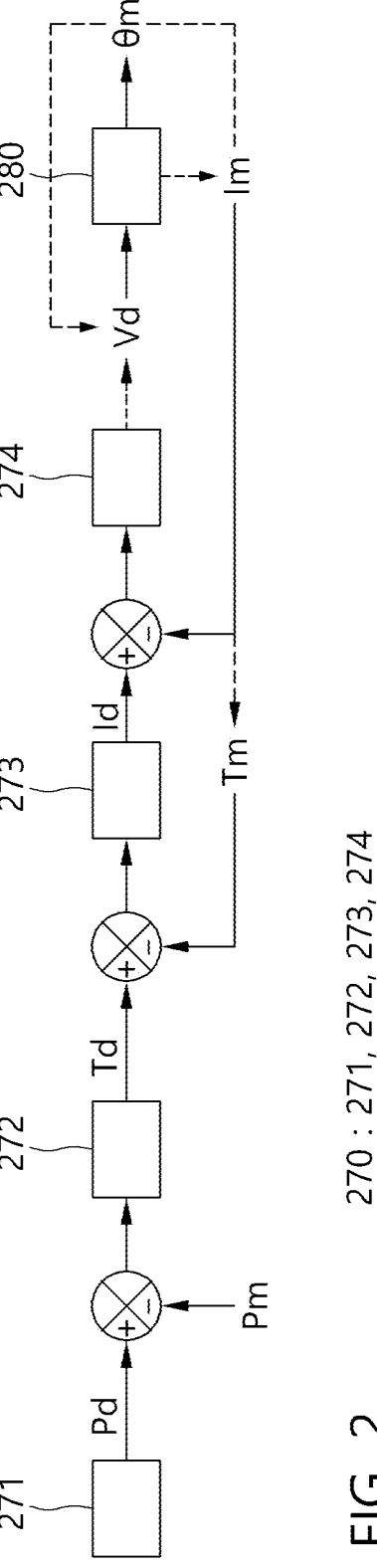
FIG. 2 is a view illustrating a detailed configuration and an operation of a wheel actuating motor controller of the steer-by-wire system of the vehicle.

FIG. 2 is a view illustrating a detailed configuration and an operation of the wheel actuating motor controller of the steer-by-wire system of the vehicle.

Referring to FIG. 2, the wheel actuating motor controller 270 may include a command generator 271, a rack position controller 272, a wheel actuating motor torque controller 273, and a wheel actuating motor current controller 274.

The command generator 271 generates a command rack position Pd which is a rack position at which a rack 290 should be positioned to correspond to input data. In this case, the input data may include one or more among a speed of the vehicle, a steering angle of the steering wheel of the vehicle, and a propulsive force of the rack 290.

The rack position controller 272 receives a difference between the command rack position Pd and a measurement rack position Pm, which is measured, and generates a command wheel actuating motor torque Td which should be generated by the wheel actuating motor 280.

The difference between the command rack position Pd and the measurement rack position Pm may be a difference between a comment value for a rack position and a measurement value for the rack position and may be defined as a first residual. In other words, the rack position controller 272 may receive the first residual and generates the command wheel actuating motor torque Td.

The wheel actuating motor torque controller 273 receives a difference between the command wheel actuating motor torque Td and a measurement wheel actuating motor torque Tm measured from the wheel actuating motor 280 and generates a command current Id which is current to be supplied to the wheel actuating motor 280.

The difference between the command wheel actuating motor torque Td and the measurement wheel actuating motor torque Tm may be a difference between a command value for a motor torque and a measurement value of the motor torque and may be defined as a second residual. In other words, the wheel actuating motor torque controller 273 may receive the second residual and generate the command current Id.

The wheel actuating motor current controller 274 receives the command current Id and a current reflecting a feedback of a measurement current Im of the motor and controls a current to be supplied to the wheel actuating motor 280. Accordingly, a voltage Vd to be applied to the wheel actuating motor 280 may be determined.

Meanwhile, the measurement current Im of the motor may be calculated from an angle θm (position) of the wheel actuating motor 280. In addition, the measurement wheel actuating motor torque Tm may be estimated from the measurement current Im of the wheel actuating motor 280.

Figure 3:
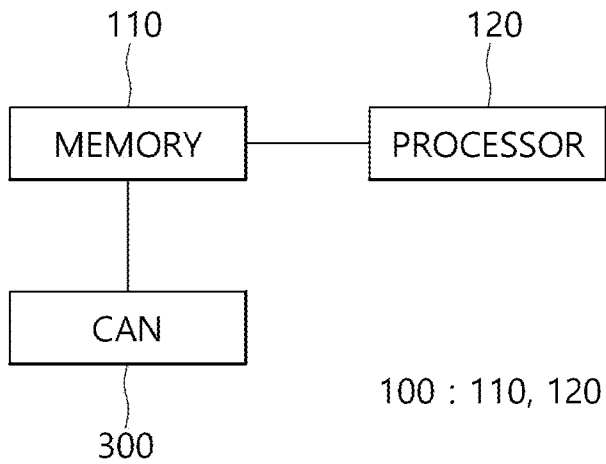
FIG. 3 is a view illustrating a configuration of a wheel actuating motor abnormality detection device according to one embodiment of the present disclosure.
Figure 4:
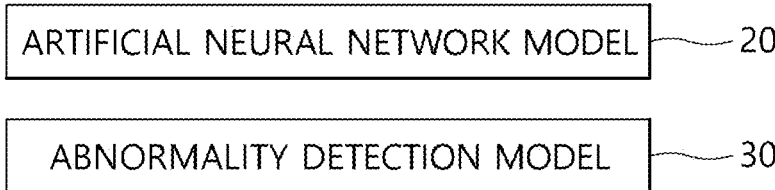
FIG. 4 is a view illustrating models used for obtaining an estimation value or detecting abnormality in the wheel actuating motor abnormality detection device according to one embodiment of the present disclosure.

FIG. 3 is a view illustrating a configuration of a wheel actuating motor abnormality detection device according to one embodiment of the present disclosure. In addition, FIG. 4 is a view illustrating models used for obtaining an estimation value or detecting abnormality in the wheel actuating motor abnormality detection device according to one embodiment of the present disclosure.

A wheel actuating motor abnormality detection device 100 according to one embodiment of the present disclosure detects abnormality of the wheel actuating motor 280 which is disposed in the steer-by-wire system 200 of the vehicle and provides a driving force for steering the wheel of the vehicle. More specifically, the wheel actuating motor abnormality detection device 100 may detect output torque reduction of the wheel actuating motor 280 before entering a failure state in which the wheel actuating motor 280 is difficult to operate.

The wheel actuating motor abnormality detection device 100 according to one embodiment of the present disclosure may prognose functional degradation of the wheel actuating motor 280 before the wheel actuating motor 280 fails through a digital twin algorithm based on an artificial intelligence. The digital twin algorithm may virtually build the steer-by-wire system of the vehicle.

Referring to FIG. 3, the wheel actuating motor abnormality detection device 100 according to one embodiment of the present disclosure may include a memory 110 and a processor 120.

The memory 110 stores one or more instructions. The one or more instructions may be executed by the processor 120.

The memory 110 may include a hardware device configured to store and execute a program instruction. For example, the memory 110 may include storage media such as a read only memory (ROM), a random-access memory (RAM), and a flash memory. In addition, the memory 110 may also include magnetic media such as a floppy disk and a magnetic tape, optical media such as a compact disk read only memory (CD-ROM) and a digital video disk (DVD), magneto-optical media such as a floptical disk, etc.

The processor 120 executes the one or more instructions. For example, the processor 120 may be a hardware unit which performs an operation and control in a computer. The processor 120 may include at least one arithmetic logic unit (ALU) and a register.

The processor 120 executes the one or more instructions to input data related to steering of the vehicle to an artificial neural network model 20 and obtain steering related estimation data output by the artificial neural network model 20.

The input data may include one or more among a speed of the vehicle, a steering angle of the steering wheel 210, and a propulsive force of the rack 290. For example, the input data may include the speed of the vehicle, the steering angle of the steering wheel 210, and the propulsive force of the rack 290.

The input data may be obtained through a controller area network (CAN) 300 of the vehicle. For example, the wheel actuating motor controller 270 may receive the propulsive force of the rack 290 and transmit propulsive force information of the rack 290 through the CAN 300.

As described above, the input data may be obtained through the CAN 300 of the vehicle. Accordingly, in the case of the present disclosure, an additional sensor related to abnormality detection of the wheel actuating motor 280 does not need to be used.

In this regard, the memory 110 may be directly or indirectly connected to the CAN 300 of the vehicle. The memory 110 may receive the input data through the CAN 300. Accordingly, the processor 120 may obtain the input data from the memory 110.

The estimation data may include a first estimation value for a first residual which is a difference between a command value for a rack position determined to correspond to the input data and a measurement value for the rack position. In addition, the estimation data may further include a second estimation value for a second residual which is a difference between a command value of a motor torque, which is determined to correspond to the input data and generated by the wheel actuating motor 280, and a measurement value of the motor torque.

The artificial neural network model 20 receives the input data and outputs the estimation data. More specifically, the artificial neural network model 20 may receive the input data and output the first estimation value and the second estimation value.

The estimation data is obtained to be compared with steering related actual measurement data. In this case, the actual measurement data may include a first actual measurement value, which is an actual measurement value for the first residual, and a second actual measurement value which is an actual measurement value for the second residual.

In one embodiment of the present disclosure, the artificial neural network model 20 may be formed in a generative adversarial network (GAN).

In one embodiment of the present disclosure, the artificial neural network model 20 may be a neural twin model based on deep learning for the steer-by-wire system of the vehicle. In other words, the artificial neural network model 20 may serve as a virtual twin model of the steer-by-wire system of the vehicle.

Figure 5:
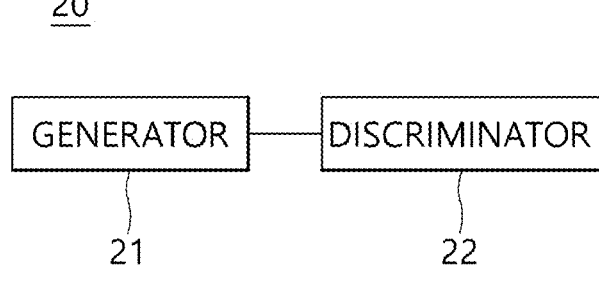
FIG. 5 is a view illustrating a detailed configuration of an artificial neural network model.

FIG. 5 is a view illustrating a detailed configuration of the artificial neural network model.

Referring to FIG. 5, the artificial neural network model 20 may include a generator 21 and a discriminator 22.

The artificial neural network model 20 may be built by alternately performing learning of the generator 21 and the discriminator 22, and data used for the learning may be obtained in a normal state of each of the vehicle and the steer-by-wire system. Accordingly, the first estimation value and the second estimation value included in the estimation data may follow the first actual measurement value and the second actual measurement value obtained in the normal state of each of the vehicle and the steer-by-wire system.

The generator 21 receives the input data and generates the estimation data. The generator 21 may include a neural network. The generator 21 may be provided as a multivariate transformer. That is, the artificial neural network model 20 may be the GAN based on the multivariate transformer.

In one embodiment of the present disclosure, the generator 21 may receive the input data related to steering of the vehicle. As described above, the input data may include the speed of the vehicle, the steering angle of the steering wheel 210, and the propulsive force of the rack 290 which receives the driving force from the wheel actuating motor 280 and moves the wheel W of the vehicle.

The generator 21 may calculate the input data to output the estimation data. More specifically, the generator 21 may output the first estimation value for the first residual and the second estimation value for the second residual.

The estimation data output by the generator 21 when the steer-by-wire system of the vehicle is normal follows the first actual measurement value for the first residual and the second actual measurement value for the second residual which are output to correspond to the input data.

Figure 6:
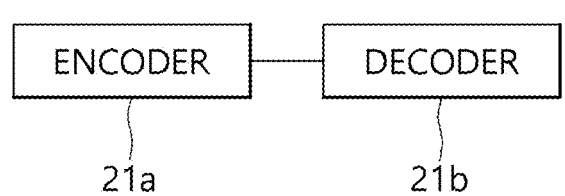
FIG. 6 is a view illustrating a detailed configuration of a generator of the artificial neural network model.

FIG. 6 is a view illustrating a detailed configuration of the generator of the artificial neural network model.

Referring to FIG. 6, the generator 21 may include an encoder 21*a* and a decoder 21*b*.

The encoder 21*a* and the decoder 21*b* constitute a network for estimating estimation data related to steering of the vehicle. In other words, the generator 21 may be formed in the network with an encoder 21a-decoder 21b structure trained in an end-to-end method to estimate the estimation data.

The encoder 21a may be designed to extract high-level features from the input data using a transformer block and a linear operation. In this case, the transformer block may include an embedding layer, a self-attention layer, and a feed-forward layer. First, in the transformer block, the embedding layer may encode spatiotemporal information into input sequences using a trainable embedding matrix.

Next, deep features may be extracted through the self-attention layer, and refinement may be performed using the feed-forward layer.

In this case, the self-attention layer may use a scaled dot-product attention mechanism. The self-attention layer may be an important component in a deep neural network (DNN) architecture based on a transformer which allows a model to process and understand dependence in an input sequence.

The scaled dot-product attention may apply layer normalization to the input sequence first, and process a result thereof as three unique vectors of a quarry Q, a key K, and a value V through the linear operation.

Next, an attention score AS for each position of the input sequence may be calculated on the basis of induced vectors. A calculation equation of the attention score AS may be given as Equation 1 below.

$$AS = \sigma\left(\frac{Q \cdot K}{\sqrt{\|X_{input}\|_{dim}}}\right) \cdot V \qquad \text{[Equation 1]}$$

($\sigma(\cdot)$ means a softmax operation, $\|X_{input}\|_{dim}$ means an input feature dimension, and ($\cdot$) means dot-product.)

The attention score quantifies relative importance of each position in the input sequence related to a given quarry. That is, a higher score is assigned to a more appropriate position.

An output of the transformer block may be provided to two different linear operations in order to calculate a quarry, a key vector, and an initial input value yi of the decoder 21b.

The decoder 21b may use obtained values to estimate one or more estimation values in an automatic regression method similar to sequence-to-sequence recurrent neural networks.

Like the encoder 21a, the decoder 21b may include a transformer block and a linear operation. The decoder 21b may also further include a cross-attention layer in the transformer block.

The cross-attention layer may perform a scaled dot-product attention using the quarry and the key vector of the encoder 21a in order to training a dynamic correlation between an input signal and an estimation signal.

The discriminator 22 receives the input data and the actual measurement data and outputs a discrimination value. The discrimination value output by the discriminator 22 for the input data and the actual measurement data may be defined as an actual measurement related discrimination value.

The discriminator 22 is a classifier that aims to determine the conditional probability. The discriminator 22 determines the probability of an example being real or fake given that set of input features. The discrimination value from the discriminator 22 are classification labels. For example, the discrimination value from the discriminator 22 is 0 or 1.

Meanwhile, the discriminator 22 may further receive the input data and the estimation data and output a discrimination value. The discrimination value output by the discriminator 22 for the input data and the estimation data may be defined as an estimation related discrimination value. This process may be performed while the generator 21 and the discriminator 22 perform learning.

As described above, the discriminator 22 may output the discrimination value for the input data and the actual measurement data in an operation process of detecting abnormality, and the discrimination value for the input data and the estimation data in an operation process of training.

The discriminator 22 may be formed in a discrimination network used for adversary training the GAN. In other words, the generator 21 and the discriminator 22 may be trained in an adversary training method to improve estimation performance and set a GAN model.

More specifically, optimization of the discriminator 22 and the generator 21 may be alternately performed in order to solve a Wasserstein min-max problem as in Equation 2.

$$\min_{G}\max_{D} \; \underset{x_{D,Real}}{E}[D(x_{D,Real})] - \underset{x_{D,Fake}}{E}[D(x_{D,Fake})] \qquad \text{[Equation 2]}$$

($X_{D,Real}$ denotes an actual data set including input data and steering related actual measurement data, and $X_{D,Fake}$ means an virtual data sample including the input data and steering related estimation data.)

In the artificial neural network model 20, the generator 21 is trained to deceive the discriminator 22 which classifies spatiotemporal characteristics of $X_{D,Real}$ and $X_{D,Fake}$. Accordingly, the generator 21 may generate an estimation value following the steer-by-wire system in the normal state.

In this regard, a loss function for training the GAN may be defined as in Equation 3 below.

$$L_G = \frac{1}{N}\sum|y_G - \hat{y}_G| + 0.001 \times \frac{1}{N}\sum[-D(x_{D,Fake})]. \qquad \text{[Equation 3]}$$

$$L_D = \frac{1}{N}\sum[D(x_{D,Fake}) - D(x_{D,Real})] +$$

$$10 \times \frac{1}{N}\sum[(\|\nabla_{x_{D,Fake}}D(x_{D,Fake})\|_2 - 1)^2]$$

(N is an arrangement size, $L_G$ is a loss function of the generator, and $L_D$ is a loss function of the discriminator.)

A first loss item of the generator 21 corresponds to an average absolute error loss $L_{MAE}$ of guidance training. The remaining loss item of the generator 21 constitutes a GAN loss function $L_{GAN}$ with a loss of the discriminator 22. In addition, the processor 120 compares the estimation data with the actual measurement data to detect whether the wheel actuating motor 280 is abnormal. As described above, the estimation data may include the first estimation value for the first residual and the second estimation value for the second residual. In addition, the actual measurement data may include the first actual measurement value which is the actual measurement value for the first residual and the second actual measurement value which is the actual measurement value for the second residual.

The processor 120 may execute the one or more instructions to input error data related to a difference between the estimation data and the actual measurement data to an abnormality detection model 30 and determine whether the wheel actuating motor is abnormal. For example, the abnormality detection model 30 may use a one-class support vector machine (OCSVM) algorithm.

There are a plurality of data sets each including the input data, the estimation data, and the actual measurement data. The error data may include an average and a standard error of errors between the actual measurement data and the estimation data of the plurality of data sets, a maximum absolute error between the actual measurement data and the estimation data of the plurality of data sets, and the actual measurement related discrimination value of the discriminator 22 for the input data and the actual measurement data included in the plurality of data sets.

In one embodiment of the present disclosure, the error data may include an average of errors between first estimation values and first actual measurement values, a standard error of the errors between the first estimation values and the first actual measurement values, a maximum absolute error between the first estimation values and the first actual measurement values, an average of errors between second estimation values and second actual measurement values, a standard error of the errors between the second estimation values and the second actual measurement values, a maximum absolute error between the second estimation values and the second actual measurement values, discrimination values of the discriminator for the input data, the first actual measurement values, and the second actual measurement values.

A plurality of data sets each including the input data, the estimation data, and the actual measurement data may be processed as one batch. For example, 100 to 150 data sets (specifically, 128 data sets) may be processed as one batch, and the error data may be obtained for each batch.

The error data obtained for one batch may be input to the abnormality detection model 30. In addition, a level of abnormality of the wheel actuating motor (performance degradation of the wheel actuating motor) may be detected on the basis of an output (feature) obtained from the abnormality detection model 30 which receives the error data.

An F1 score given as in Equation 4 may be considered in relation to an anomaly detection metric.

$$F1 = \frac{2 \times TP}{2 \times TP + FP + FN} \qquad \text{[Equation 4]}$$

(TP denotes a true positive, FP denotes a false positive, FN denotes a false negative, and positive denotes performance degradation of the wheel actuating motor.)

Meanwhile, as described above, the discriminator 22 may calculate not only the discrimination value for the input data and the actual measurement data included in the data set but also the discrimination value for the input data and the estimation data included in the data set. The discrimination value of the discriminator 22 for the estimation data of the data set may be fed back to the generator 21 of the artificial neural network model 20 and used for training.

The configuration of the wheel actuating motor abnormality detection device 100 according to one embodiment of the present disclosure has been described in detail. Hereinafter, an operation of the wheel actuating motor abnormality detection device 100 will be described in detail.

Figure 7:
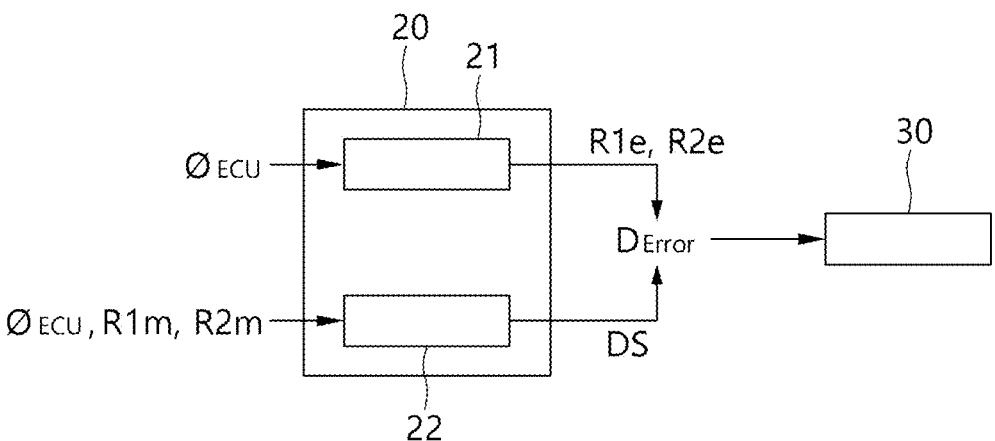
FIG. 7 is a view illustrating an operation of the wheel actuating motor abnormality detection device according to one embodiment of the present disclosure.

FIG. 7 is a view illustrating an operation of the wheel actuating motor abnormality detection device according to one embodiment of the present disclosure. Referring to FIG. 7, the wheel actuating motor abnormality detection device 100 according to one embodiment of the present disclosure may operate as described below.

First, the memory 110 stores input data ØEcu and actual measurement data. In this case, the actual measurement data may include a first actual measurement value R1m of a first residual which is actually measured and a second actual measurement value R2m of a second residual which is actually measured.

As described above, the input data ØEcu may include one or more among a speed of the vehicle, a steering angle of the steering wheel, and a propulsive force of the rack. In addition, a plurality of pieces of the input data $\emptyset_{Ecu}$ and the actual measurement data including the first actual measurement value R1m and the second actual measurement value R2m may be processed as one batch. That is, in one embodiment of the present disclosure, a data processing and an operation may be performed in units of batches.

Next, the processor 120 executes one or more instructions to input the input data $\emptyset_{ECU}$ to the artificial neural network model 20 and obtains estimation data output by the artificial neural network model 20. More specifically, the processor 120 may input the input data $\emptyset_{ECU}$ to the generator 21 of the artificial neural network model 20 and obtain the estimation data including a first estimation value R1e which is an estimation value for the first residual and a second estimation value R2e which is an estimation value for the second residual which are output by the generator 21.

In addition, the processor 120 executes one or more instructions to input the input data $\emptyset_{ECU}$, the first actual measurement value R1m, and the second actual measurement value R2m to the artificial neural network model 20 and obtains a discrimination value DS. More specifically, the processor 120 may input the input data $\emptyset_{ECU}$, the first actual measurement value R1m, and the second actual measurement value R2m to the discriminator 22 and obtain the discrimination value DS.

Next, the processor 120 outputs error data $D_{Error}$. The error data $D_{Error}$ may be output for each data batch.

More specifically, there may be a plurality of data sets each including the input value, the one or more estimation values, and the one or more actual measurement values.

In this case, the error data $D_{EROR}$ may include an average $\mu_{E(R1)}$ of errors between first estimation values R1e and first actual measurement value R1m, a standard error $\sigma_{E(R1)}$ of the errors between the first estimation values R1e and the first actual measurement values R1m, a maximum absolute error $\text{Max}_{E(R1)}$ between the first estimation values $R1_e$ and the first actual measurement values R1m, an average $\mu_{E(R2)}$ of errors between second estimation values R2e and second actual measurement values R2m, a standard error $\sigma_{E(R2)}$ of the errors between the second estimation values R2e and the second actual measurement values R2m, a maximum absolute error $\text{Max}_{E(R2)}$ between the second estimation values R2e and the second actual measurement values R2m, and discrimination values DS of the discriminator for the input data $\emptyset_{ECU}$, the first actual measurement values R1m, and the second actual measurement values R2m.

Finally, the processor 120 executes one or more instructions to input the error data $D_{Error}$ to the abnormality detection model 30 and obtains an output of the abnormality detection model 30. As described above, the abnormality detection model 30 may include the OCSVM algorithm.

The processor 120 may detect a level of abnormality of the wheel actuating motor (performance degradation of the wheel actuating motor) of the steer-by-wire system on the basis of an output (feature) obtained from the abnormality detection model 30 which receives the error data $D_{Error}$.

As described above, the wheel actuating motor abnormality detection device 100 according to one embodiment of the present disclosure has been described in detail. Hereinafter, a wheel actuating motor abnormality detection method will be described.

FIG. 8 is a flowchart illustrating the wheel actuating motor abnormality detection method according to one embodiment of the present disclosure.

In a wheel actuating motor abnormality detection method S100 according to one embodiment of the present disclosure, abnormality of the wheel actuating motor, which is disposed in the steer-by-wire system of the vehicle and provides a driving force for steering the wheel of the vehicle, is detected.

Referring to FIG. 8, the wheel actuating motor abnormality detection method S100 according to one embodiment of the present disclosure may be performed as follows.

First, the processor 120 inputs input data related to steering of the vehicle to the artificial neural network model 20 and obtains steering related estimation data output by the artificial neural network model 20 (S110).

The input data may include one or more among a speed of the vehicle, a steering angle, and a propulsive force of the rack. In one embodiment of the present disclosure, the input data may include the speed of the vehicle, the steering angle of the steering wheel 210, and the propulsive force of the rack 290.

Meanwhile, the input data may be obtained through the CAN 300 of the vehicle.

The estimation data may include a first estimation value for a first residual which is a difference between a command value for a position of the rack 290 determined to correspond to the input data and a measurement value for the position of the rack 290. In addition, the estimation data may further include a second estimation value for a second residual which is a difference between a command value of a motor torque transmitted to the wheel actuating motor 280 to correspond to the input data and a measurement value of the motor torque.

The estimation data is obtained to be compared with actual measurement data related to steering. In this case, the actual measurement data may include a first actual measurement value which is an actual measurement value for the first residual and a second actual measurement value which is an actual measurement value for the second residual.

In one embodiment of the present disclosure, the artificial neural network model 20 may include the GAN. In other words, the artificial neural network model 20 may be the neural twin model based on deep learning for the steer-by-wire system of the vehicle.

The artificial neural network model 20 may include the generator 21 and the discriminator 22. The generator 21 receives the input data and generates the estimation data. The generator 21 may be provided as the multivariate transformer. In addition, the discriminator 22 may receive the input data and the actual measurement data and output an actual measurement related discrimination value.

In operation S110 of obtaining the one or more estimation values, the processor 120 may input the input data to the generator 21 and obtain the estimation data generated by the generator 21.

Meanwhile, the artificial neural network model 20 may be built by alternately performing learning of the generator 21 and the discriminator 22, and the input data and the actual measurement data used for the learning may be obtained in a normal state of each of the vehicle and the steer-by-wire system. Accordingly, the estimation data may follow the steering related actual measurement data in the normal state of the steer-by-wire system.

Next, the processor 120 compares the estimation data with the actual measurement data to detect whether the wheel actuating motor is abnormal (S120).

The processor 120 may execute one or more instructions to input error data related to a difference between the estimation data and the actual measurement data to the abnormality detection model 30 to determine whether the wheel actuating motor is abnormal. For example, the abnormality detection model 30 may use the OCSVM algorithm.

FIG. 9 is a detailed flowchart illustrating detecting whether the wheel actuating motor is abnormal in the wheel actuating motor abnormality detection method according to one embodiment of the present disclosure.

Referring to FIG. 8, operation S120 of detecting whether the wheel actuating motor is abnormal may be performed as follows.

First, the processor 120 inputs the input data and the actual measurement data to the discriminator 22 and obtains an actual measurement related discrimination value generated by the discriminator 22 (S121).

Next, the processor 120 inputs the actual measurement related discrimination value and the error data including values related to the difference between the estimation data and the actual measurement data to the abnormality detection model 30 and obtains an output of the abnormality detection model 30 (S122).

There may be a plurality of data sets each including the input data, the estimation data, and the actual measurement data. The error data may include an average and a standard error of errors between the actual measurement data and the estimation data of the plurality of data sets, a maximum absolute error between the actual measurement data and the estimation data of the plurality of data sets, and a discrimination value of the discriminator 22 for the input data and the actual measurement data obtained from the plurality of data sets.

In one embodiment of the present disclosure, the error data may include an average of errors between first estimation values and first actual measurement values, a standard error of the errors between the first estimation values and the first actual measurement values, a maximum absolute error between the first estimation values and the first actual measurement values, an average of errors between second estimation values and second actual measurement values, a standard error of the errors between the second estimation values and the second actual measurement values, a maximum absolute error between the second estimation values and the second actual measurement values, and discrimination values of the discriminator for the input data, the first actual measurement values, and the second actual measurement values.

A plurality data sets including the estimation data and the actual measurement data may be processed as one batch. For example, 100 to 150 data sets (specifically, 128 data sets) may be processed as one batch, and the error data may be obtained for each batch.

The error data obtained for one batch may be input to the abnormality detection model 30. In addition, a level of the abnormality of the wheel actuating motor (performance degradation of the wheel actuating motor) may be detected on the basis of an output (feature) obtained from the abnormality detection model 30 which receives the error data.

Meanwhile, the present disclosure further provides the non-transitory computer-readable storage medium in which a program for performing the wheel actuating motor abnormality detection method is stored. Specifically, the present disclosure may provide the non-transitory computer-readable storage medium in which the program including at least one instruction for performing the wheel actuating motor abnormality detection method is stored.

In this case, the instruction may include a machine language code generated by a compiler. In addition, the instruction may also include a high-level language code which may be executed by a computer.

The storage medium may include a hardware device, such as magnetic media including a hard disk, a floppy disk, and a magnetic tape, optical media including a CD-ROM and a DVD, a magneto-optical media including a floptical disk, a ROM, a RAM, and a flash memory which are configured to store and execute a program instruction.

The above described F1 score may be considered in relation to an anomaly detection metric.

As a result of simulation, in the case of the present disclosure, it is seen that performance of the wheel actuating motor can be predicted to be degraded to 10% of a maximum output power thereof with a F1 score of 0.85 or more. In other words, in the case of the present disclosure, a degradation level of the wheel actuating motor, which is disposed in the steer-by-wire system and provides a driving force for steering the wheel, can be accurately predicted before the wheel actuating motor completely fails.

According to the present disclosure, failure of the wheel actuating motor of the steer-by-wire system can be predicted before occurring. As a result, a proactive measure can be performed before the wheel actuating motor fails, and the failure of the wheel actuating motor can be effectively prevented.

As described above, the present disclosure provides estimation of future operation and remaining effective lifetime of a system and prognostic proper to a predictive maintenance application. Accordingly, a proactive measure and maintenance can be effectively guided before the wheel actuating motor of the steer-by-wire system fails.

According to the above described configuration, the wheel actuating motor abnormality detection device and method and the non-transitory computer-readable storage medium in which a program for performing the method according to one aspect of the present disclosure is stored can prognose performance degradation of the wheel actuating motor which provides a driving force for steering the wheel of the vehicle in the steer-by-wire system on the basis of the digital twin algorithm based on artificial intelligence before the wheel actuating motor fails.

In addition, the wheel actuating motor abnormality detection device and method and the non-transitory computer-readable storage medium in which a program for performing the method is stored can predict performance degradation of the wheel actuating motor using CAN signals of the vehicle without an additional sensor.

It should be understood that the effects of the present disclosure are not limited to the above-described effects, and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. A device comprising:
a memory configured to store one or more instructions; and
a processor configured to execute the one or more instructions comprising:
inputting input data, related to steering of a vehicle, to an artificial neural network model;
obtaining estimation data, related to the steering of the vehicle, from the artificial neural network model; and
detecting whether a wheel actuating motor included in a steer-by-wire system of the vehicle configured to generate a driving force for steering a wheel of the vehicle is in an abnormal state by comparing the estimation data with actual measurement data related to the steering of the vehicle,
wherein:
the input data related to the steering of the vehicle includes one or more among a speed of the vehicle, a steering angle of a steering wheel of the vehicle or a propulsive force of a rack configured to be movable by the driving force generated by the wheel actuating motor to move the wheel of the vehicle;
the estimation data related to the steering of the vehicle includes a first estimation value for a first residual which is a difference between a command value for a rack position determined to correspond to the input data and a measurement value for the rack position; and
the actual measurement data includes a first actual measurement value which is an actual measurement value for the first residual.

2. The device of claim 1, wherein:
the estimation data related to the steering of the vehicle further includes a second estimation value for a second residual which is a difference between a command value of a motor torque determined to correspond to the input data and generated by the wheel actuating motor and a measurement value of the motor torque; and
the actual measurement data further includes a second actual measurement value which is an actual measurement value for the second residual.

3. The device of claim 1, wherein the processor is configured to obtain the input data through a controller area network (CAN) of the vehicle.

4. The device of claim 1, wherein the artificial neural network model is comprised in a generative adversarial network (GAN) including a generator configured to receive the input data, related to the steering of the vehicle, and generate the estimation data, related to the steering of the vehicle; and a discriminator configured to, in response to the input data, related to the steering of the vehicle, and the actual measurement data, output an actual measurement related discrimination value.

5. The device of claim 4, wherein the generator comprises a multivariate transformer.

6. The device of claim 4, wherein the processor is configured to input error data related to a difference between the estimation data and the actual measurement data to an abnormality detection model, and determine whether the wheel actuating motor is in the abnormal state based on an output of the abnormality detection model.

7. The device of claim 6, wherein the abnormality detection model is configured to use a one-class support vector machine (OCSVM) algorithm.

8. The device of claim 6, wherein:
each of a plurality of data sets includes the input data, the estimation data, and the actual measurement data; and the error data includes an average and a standard error of errors between actual measurement data and estimation data of the plurality of data sets, a maximum absolute error between the actual measurement data and the estimation data of the plurality of data sets, and an actual measurement related discrimination value of the discriminator for the input data and the actual measurement data of the plurality of data sets.

9. The device of claim 4, wherein the discriminator is further configured to, in response to the input data and the estimation data, output an estimation related discrimination value.

10. The device of claim 9, wherein:
the artificial neural network model is configured to alternately perform learning of the generator and the discriminator; and
the processor is configured to obtain the input data and the actual measurement data used for the learning of the generator and the discriminator when the vehicle and the wheel actuating motor are in a normal state.

11. A computerized method comprising:
inputting input data, related to steering of a vehicle, to an artificial neural network model;
obtaining estimation data, related to the steering of the vehicle, from the artificial neural network model; and
detecting whether a wheel actuating motor included in a steer-by-wire system of the vehicle configured to generate a driving force for steering a wheel of the vehicle is in an abnormal state by comparing the estimation data with actual measurement data related to the steering of the vehicle,
wherein the input data related to the steering of the vehicle includes one or more among a speed of the vehicle, a steering angle of a steering wheel of the vehicle, or a propulsive force of a rack configured to be movable by the driving force generated by the wheel actuating motor to move the wheel of the vehicle;
the estimation data related to the steering of the vehicle includes a first estimation value for a first residual which is a difference between a command value for a rack position determined to correspond to the input data and a measurement value for the rack position; and
the actual measurement data includes a first actual measurement value which is an actual measurement value for the first residual.

12. The method of claim 11, wherein:
the estimation data related to the steering of the vehicle further includes a second estimation value for a second residual which is a difference between a command value of a motor torque determined to correspond to the input data and generated by the wheel actuating motor and a measurement value of the motor torque; and
the actual measurement data further includes a second actual measurement value which is an actual measurement value for the second residual.

13. The method of claim 11, wherein the artificial neural network model is comprised in a generative adversarial network (GAN) including a generator configured to receive the input data, related to the steering of the vehicle, and generate the estimation data, related to the steering of the vehicle, and a discriminator configured to, in response to the input data, related to the steering of the vehicle, and the actual measurement data, output an actual measurement related discrimination value.

14. The method of claim 13, wherein the detecting of whether the wheel actuating motor is in the abnormal state includes:
by inputting the input data and the actual measurement data to the discriminator, obtaining the actual measurement related discrimination value generated by the discriminator; and
by inputting the actual measurement related discrimination value and error data including values related to a difference between the estimation data and the actual measurement data to an abnormality detection model, obtaining an output from the abnormality detection model.

15. The method of claim 14, wherein:
each of a plurality of data sets includes the input data, the estimation data, and the actual measurement data; and
the error data includes an average and a standard error of errors between actual measurement data and estimation data of the plurality of data sets, a maximum absolute error between the actual measurement data and the estimation data of the plurality of data sets, and an actual measurement related discrimination value of the discriminator for the input data and the actual measurement data of the plurality of data sets.

16. A non-transitory computer-readable storage medium configured to instructions that when executed by one or more processors, cause the one or more processors to perform operations comprising:
inputting input data, related to steering of a vehicle, to an artificial neural network model;
obtaining estimation data, related to the steering of the vehicle, from the artificial neural network model; and
detecting whether a wheel actuating motor included in a steer-by-wire system of the vehicle configured to generate a driving force for steering a wheel of the vehicle is in an abnormal state by comparing the estimation data with actual measurement data related to the steering of the vehicle,
wherein the input data related to the steering of the vehicle includes one or more among a speed of the vehicle, a steering angle of a steering wheel of the vehicle, or a propulsive force of a rack configured to be movable by the driving force generated by the wheel actuating motor to move the wheel of the vehicle;
the estimation data related to the steering of the vehicle includes a first estimation value for a first residual which is a difference between a command value for a rack position determined to correspond to the input data and a measurement value for the rack position; and
the actual measurement data includes a first actual measurement value which is an actual measurement value for the first residual.

* * * * *